April 24, 1962 W. H. REINHOLTZ 3,031,646

CHECKING CIRCUIT FOR DIGITAL COMPUTERS

Filed Jan. 26, 1959

INVENTOR.
WILLIAM H. REINHOLTZ
BY [signature]

ATTORNEY

United States Patent Office 3,031,646
Patented Apr. 24, 1962

3,031,646

CHECKING CIRCUIT FOR DIGITAL COMPUTERS

William H. Reinholtz, La Crescenta, Calif., assignor to General Precision, Inc., a corporation of Delaware Filed Jan. 26, 1959, Ser. No. 789,187
2 Claims. (Cl. 340—147)

Figure 1:
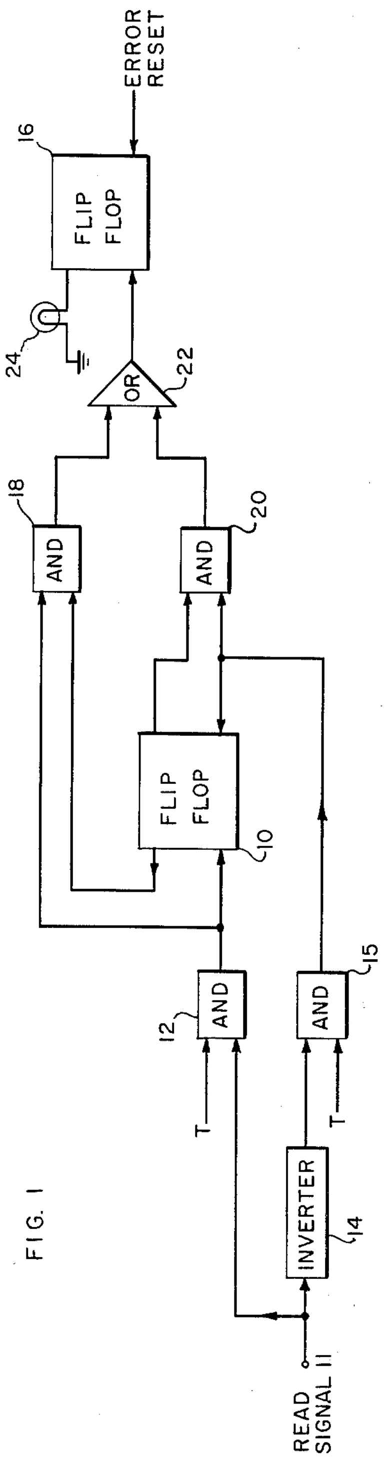

This invention relates to a novel and improved apparatus for checking the operation of electronic digital computers, and more particularly to a new and improved apparatus for automatic checking of a non-return-to-zero electrical signal in such a computer.

In the operation of electronic digital computers, a major problem is to determine when the computer is functioning properly and to provide means for signaling that a mistake has been made in the operation of the computer. One method of checking such operation which has been widely used in various forms is the so-called "parity" check. In this type of operation, a count is made of the number of "1's" contained in a binary number or "word," when the word is recorded in the memory. If the count reveals an even number of "1's" a "0" is recorded, and if the count shows an odd number of "1's," a "1" is recorded in the memory. When the word is read back from the memory, another count is made. The result of the second count is compared with the result of the first count and a disagreement indicates that an error has been made.

It can readily be seen, however, that the "parity" check is not a complete check of the accuracy of the recording, since an even number of additional "1's" or "0's" will not be detected. Further, the "parity" check requires extra circuitry which can only be used to conduct the check. In addition, the "parity" check requires additional memory space to record the "parity" bit.

One object of this invention is to provide a new method and apparatus for automatically checking the information stored in a memory using a non-return-to-zero magnetic record.

Another object of this invention is to provide a new method and apparatus for automatically checking the operation of an electronic digital computer.

A further object of this invention is to provide reliable checking circuitry of simple and inexpensive construction.

A still further object of this invention is to provide novel circuit for automatically checking of a non-return-to-zero electrical signal which does not require the use of additional memory space.

Other objects of this invention will be apparent to those skilled in the art from a reading of the following specification and an inspection of the accompanying drawing, in which:

FIGURE 1 shows, in schematic form, an embodiment of this invention.

Before presenting a detailed description of this invention, it is deemed desirable to discuss the fundamental principle upon which the operation of this invention is predicated. Digital computers utilize information which is generally supplied in binary form; that is, a given piece of data is found as a combination of "1's" and "0's." Such a piece of data is generally called a "word." Many electronic digital computers utilize words which are presented digit by digit in serial fashion. In a typical electronic digital computer a "1" is represented by a first electrical voltage and a "0" is represented by a second electrical voltage. Thus, a word will be made up of electrical signals alternating between said two particular voltages.

One of the most sensitive operations necessary in the utilization of electronic digital computing techniques, is the recording of such words in a memory and reading such words from the memory at some desired future time. Since it is necessary in the operation of electronic digital computers to remember certain words for varying periods of time, means must be supplied to store the selected words. A typical means of storing the patterns of alternating voltages forming a word is by the use of magnetic recording on a rotating drum or moving tape. One method of recording information on such a drum or tape is by introducing an electrical voltage into a transducer, such that the transducer converts the voltage into a magnetic field of a first polarization and produces a correspondingly polarized portion on the drum or tape. A first electrical voltage will always be introduced to represent a "1," and a second electrical voltage will be introduced into the transducer to represent a "0." The second voltage is selected so that it produces a second and opposite polarization of the transducer and a magnetic field of opposite polarization surrounding the transducer. This magnetic field produces a polarization on the tape or drum opposite to said first polarization. In order to synchronize the recording of information on the drum and the reading of information from the drum, a timing, or clock signal, is usually provided.

Several methods of recording on drums or tapes have been used, but the non-return-to-zero method of recording is extremely useful and commonly employed. In this method, a "1" is represented by polarization in a first direction on the recording medium (drum or tape) and a "0" is represented by polarization in an opposite direction on the recording medium. However, a succession of "1's" or "0's" produces on the drum a single, larger polarization; that is, there is no change of polarization to either a "0" level or any other level between the digits in a succession of "1's" or "0's."

When operating in a non-return-to-zero system, the polarization itself does not affect the read-back signal, rather it is a change in polarization which produces an electrical signal in the reading transducer. A change in a first direction will be sensed as a "1" and a change in the opposite direction will be sensed as a "0." If a succession of "1's" is recorded, only "1" will be sensed. Until a change in the opposite direction is sensed, a "1" will be sensed at each timing interval or clock time after a "1" change has been sensed and before a subsequent "0" change is sensed. Similarly, after a change corresponding to a "0" has been recorded, at each interval of clock time, the "0" will be sensed until a "1" change is again sensed.

At no time can there be two "1" changes successively, nor two "0" changes successively, since this method of recording cannot yield two successive "1" changes or two successive "0" changes, unless an error in reading has been made.

Briefly described, my invention comprises circuitry which detects any succession of two "1" changes or two "0" changes, and provides an error indicating signal upon such a succession. The only memory device employed is a flip flop, and no memory space in the magnetically recorded memory is necessary.

The construction and operation of a flip flop, and inverter as well as an "or" gate is well known in the computer art. As an example in copending application of Williamson et al., "Digital Computer," S.N. 697,299, filed November 8, 1957, complete descriptions of the above will be found.

In the detailed description of this invention which follows as shown in FIGURE 1, the notation conventional in the digital computer art will be used.

A flip flop 10 is set by a signal read from a memory device. This signal is read at synchronized times with a clock signal providing the synchronization, as hereinbefore described. The operation of flip flop 10 is described by the following equations:

$$a=ST$$
$$\bar{a}=\bar{S}T$$

in which:

$a$=a triggering signal introduced to the left input terminal of the flop flop 10;
$\bar{a}$=a triggering signal introduced to the right input terminal of the flip flop 10;
$T$=the presence of a clock or synchronizing signal;
$S$=a relatively high voltage at the terminal 11; and
$\bar{S}$=a relatively low voltage at the terminal 11; also
$A$=a relatively high voltage on the left output terminal of the flip flop 10; and
$\bar{A}$=a relatively high voltage on the right output terminal of the flip flop 10.

An electrical pulse appearing on the $a$ line will set flip flop 10 to an A condition and an electrical pulse appearing on the $\bar{a}$ line will set flip flop 10 to an $\bar{A}$ condition.

The read signal from terminal 11 and the clock signal T are fed into an "and" gate 12, which has as its output a relatively high voltage when both signals are present simultaneously at its input. Thus a pulse is introduced to the left input terminal of the flip-flop 10 only when both the read signal S and a clock pulse T exist simultaneously. The right input terminal of flip flop 10 receives its input from "and" gate 15. The signal S is introduced from terminal 11 to an inverter 14 which provides an inversion of the signal S. The output of the inverter 14 and the clock signal T are introduced as the inputs to "and" gate 15. Thus, when the read signal is relatively low $\bar{S}$, and a clock pulse T exists, the "and" gate 15 has an output. The output of "and" gate 15 is introduced to the right input terminal of flip flop 10.

Another flip flop designated the error flip flop 16 is provided. The operation of error flip flop 16 is described by the following equations:

$$e=aA+\bar{a}\bar{A}$$

in which:

$a$=the signal from "and" gate 12;
$\bar{a}$=the signal from "and" gate 15; and
$e$=a triggering signal introduced to the left input terminal of the flip flop 16; also
$E$=a relatively high voltage on the left output terminal of the flip flop 16; and
$\bar{E}$=a relatively high voltage on the right input terminal of the flip flop 16.

If the error flip flop 16 is set to an E condition when $a$ exists in combination with A or when $\bar{a}$ exists in combination with $\bar{A}$, we have detected any successive pair of "1's" or "0's," and represented such a succession by placing the error flip flop 16 in an E condition, in which the left output terminal of the flip flop 16 has a relatively high voltage. A relatively high voltage on the left output terminal of the error flip flop 16 E indicates that an error has been made. This follows since the first "1" pulse will set the flip flop 10 into an A condition, and if no "0" pulse occurs to reset the flip flop 10 to an $\bar{A}$ condition, the next "1" pulse will cause both $a$ and A to exist simultaneously, and set the error flip flop 16 to an E condition. Correspondingly, if the flip flop 10 receives a "0" pulse setting the flip flop 10 into an $\bar{A}$ condition, a successive "0" pulse, will cause both $\bar{a}$ and $\bar{A}$ to occur simultaneously and will set the error flip flop 16 to an E condition.

FIGURE 1 shows the circuitry for achieving the result given by the equation above. An "and" gate 18 has as its inputs $a$ and A. A second "and" gate 20 has as its input $\bar{a}$ and $\bar{A}$. The outputs of "and" gates 18 and 20 serve as inputs to an "or" gate 22 which in turn forms the input to the left input terminal of the error flip flop 16. An indicating lamp 24 will flash when the error flip flop 16 is in an E condition. The error flip flop can be reset to an $\bar{E}$ condition and the indicating lamp 24 extinguished by any desired means, such as a switch in series with a battery, which can be actuated whenever the error has been discovered.

It should be understood, of course, that the foregoing disclosure relates only to a preferred embodiment of the invention and that numerous modifications and alterations may be made therein without departing from the spirit and scope of the invention as set forth in the appended claims.

What is claimed and desired to be protected by Letters Patent of the United States is:

1. An error checking circuit for digital computers wherein a train of pulses which should occur at certain random intervals with alternating opposite polarity is derived from a non-return-to-zero signal, comprising an inverter, first and second "and" gates, a flip-flop having two inputs and two corresponding outputs, one of said inputs being coupled through said first "and" gate to said train of pulses, the other of said inputs being coupled through said second "and" gate and said inverter to said train of pulses, each of said "and" gates being adapted to receive a series of simultaneous clock pulses between digits for gating one of said train of pulses to one of said flip-flop inputs only at particular times, a third "and" gate coupled to said one input and its corresponding output, and a fourth "and" gate coupled to said other input and its corresponding output, whereby an error output signal is provided only when successive pulses occur during a clock time and have the same polarity.

2. An error checking circuit as set forth in claim 1 wherein an "or" gate is coupled to the output of said third and fourth "and" gates, a second flip-flop is provided having one input coupled to said "or" gate and another input adapted to be coupled to an error reset signal, and an error indicator connected to an output from said second flip-flop.

References Cited in the file of this patent

UNITED STATES PATENTS

| | | |
|---|---|---|
| 2,609,143 | Stibitz | Sept. 2, 1952 |
| 2,719,959 | Hobbs | Oct. 4, 1955 |
| 2,764,463 | Lubkin et al. | Sept. 25, 1956 |
| 2,786,978 | Warner | Mar. 26, 1957 |

OTHER REFERENCES

"Proceedings of the IRE," volume 45, May 1957, pp. 656–661, FIG. 2 relied on.